United States Patent [19]

Armen

[11] Patent Number: 4,957,444

[45] Date of Patent: Sep. 18, 1990

[54] TRAINING HORSE SIMULATOR

[75] Inventor: Seth A. Armen, Weston, Conn.

[73] Assignee: Pegasus Therapeutic Riding, Inc., Darien, Conn.

[21] Appl. No.: 272,705

[22] Filed: Nov. 17, 1988

[51] Int. Cl.⁵ .................. G09B 19/00; A63G 19/00; A63B 69/00

[52] U.S. Cl. .................. 434/247; 272/53.1; 272/52.5

[58] Field of Search .......... 434/247; 272/52, 53.1, 272/52.5, 53.2

[56] References Cited

U.S. PATENT DOCUMENTS

| | | |
|---|---|---|
| 2,721,419 | 10/1955 | Carstensen . |
| 3,672,075 | 6/1972 | Eikelenboom ............... 434/247 |
| 3,716,941 | 2/1973 | Dowden et al. . |
| 3,751,828 | 8/1973 | Frame ...................... 434/247 |
| 4,190,968 | 3/1980 | Clapp et al. ................ 434/247 |
| 4,289,307 | 9/1981 | Marshall, Jr. et al. ........ 272/525 |
| 4,713,010 | 12/1987 | Veillas .................... 434/247 |

FOREIGN PATENT DOCUMENTS 1301420  4/1987  U.S.S.R. ................ 434/247

Primary Examiner—Paul E. Shapiro
Assistant Examiner—Valerie Szczepanik
Attorney, Agent, or Firm—St. Onge Steward Johnston & Reens

[57] ABSTRACT

A training horse simulator is provided for teaching persons such as handicapped children. The simulator includes a saddle, a pivoting head assembly, reins, a bit simulator, and pressure-sensitive switches. Indicators inform the person when stops and turns have been properly executed, and when pressure is applied to the simulator as in posting.

8 Claims, 5 Drawing Sheets

TRAINING HORSE SIMULATOR

FIELD OF THE INVENTION

This invention relates generally to training simulators and more particularly to a horse simulator for training persons such as handicapped children.

BACKGROUND ART

Horse simulators and training devices having a variety of features are known in the art.

U.S. Pat. No. 2,721,419 to Carstens a toy simulated horse having independent simulated horseshoes which may be applied to and removed from the hooves. U.S. Pat. No. 3,672 to Eikelenboom discloses a training apparatus to practice the mechanical athletic side of various kinds of horsemanship. U.S. Pat. No. 3,751,828 to Frame discloses a rein manipulation training device especially useful for learning to differentiate between the snaffle bit and the curb bit. U.S. Pat. No 4,190,968 to Clapp et al. discloses a training device for horsemanship which provides visual indication to a rider, via pressure switches, of how a live horse is moving beneath them.

SUMMARY OF THE INVENTION

This invention relates to a horse simulator for teaching a person how to ride a horse. One type of horse simulator, in accordance with the invention, has legs, a body, a neck and a head. The horse's neck is pivotally mounted to its body. The horse's body includes a simulated saddle with stirrups to practice mounting. The horse's head includes a bit simulator and reins to practice stopping and turning. Indicators inform the person being taught when stops and turns have been properly executed. Pressure-sensitive switches activate indicators to inform the person being taught when pressure is properly applied to the horse's body, for example when posting.

It is an object of this invention to provide a device upon which a person can repeatedly practice basic horse riding skills such as mounting and rein handling to stop and turn without confusion and fatigue of an actual horse. It is a further object of the invention to provide a horse simulator that is particularly useful and effective with handicapped children.

These and other objects of the invention will become more apparent from the following detailed description made with reference to the accompanying drawings.

BRIEF DESCRIPTION OF THE DRAWINGS

FIG. 2A is a front elevational view of a metronome and a timer which may be used in conjunction with the horse in FIG. 1.

DETAILED DESCRIPTION OF THE INVENTION

Figure 1:
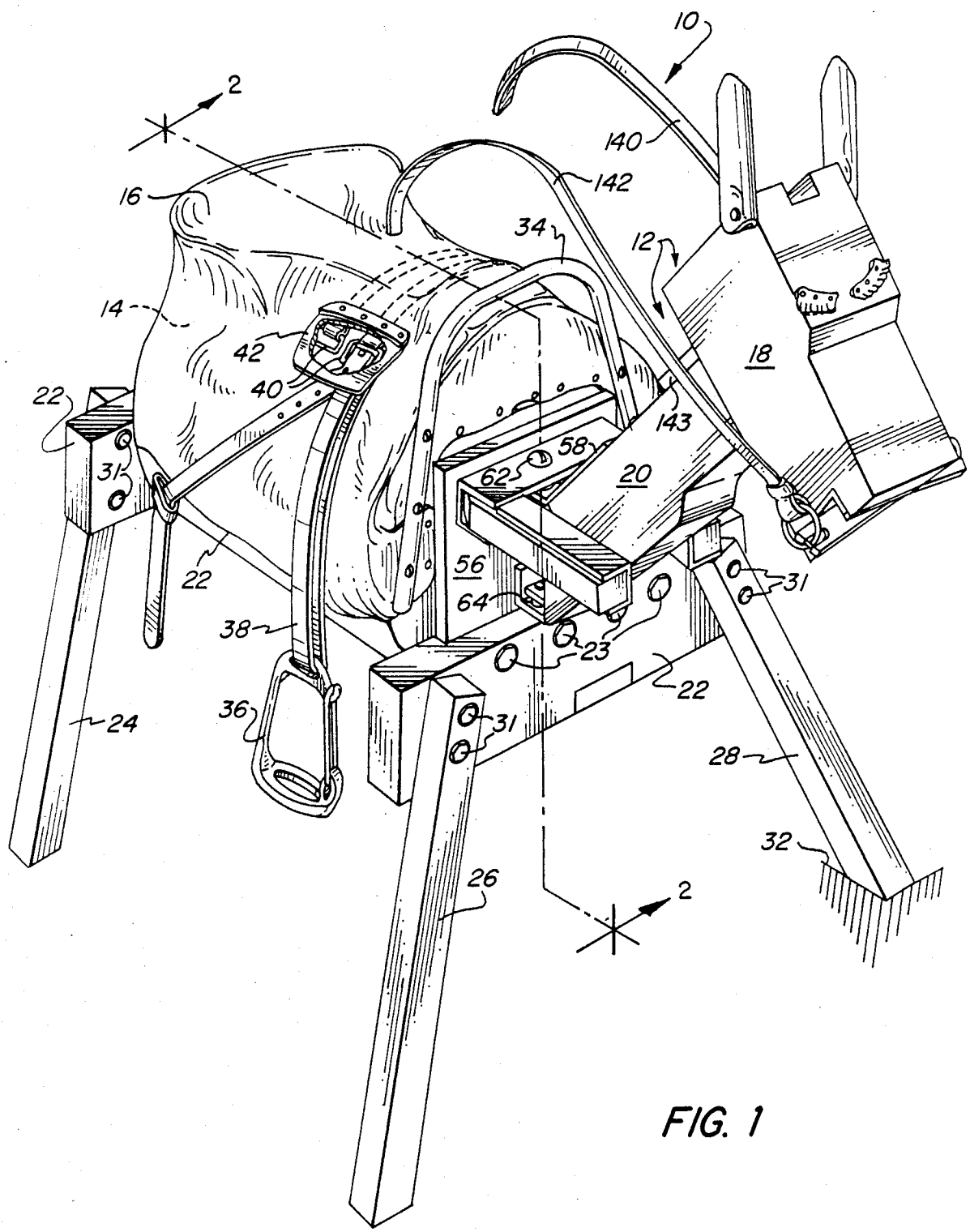
FIG. 1 is a front perspective view of a horse simulator of this invention.

With reference to the drawings and especially FIG. 1, a horse simulator 10 is shown in a front perspective view. Horse simulator 10 includes a head assembly 12 and a barrel 14. Barrel 14 includes a contoured seat or saddle 16 on its upper surface as can be seen more clearly in FIGS. 2 and 3. Head assembly 12 comprises a head 18 and a neck 20.

Barrel 14 simulates a horse's body or trunk and is attached to and supported by a frame 22 with bolts 23. Four legs 24, 26, 28, and 30 (see FIG. 2) are attached to frame 22 with bolts 31 to raise supported barrel 14 above a floor indicated at 32.

Saddle 16 includes a handle 34 which simulates a pommel. Being easier to grip, handle 34 aids small children or handicapped persons in mounting horse simulator 10. Saddle 16 also includes stirrups 36 and adjustable stirrup leathers 38. Buckles 40 for adjustable stirrup leathers 38 may conveniently be located beneath leather flaps 42 to prevent chafing.

Figure 2:
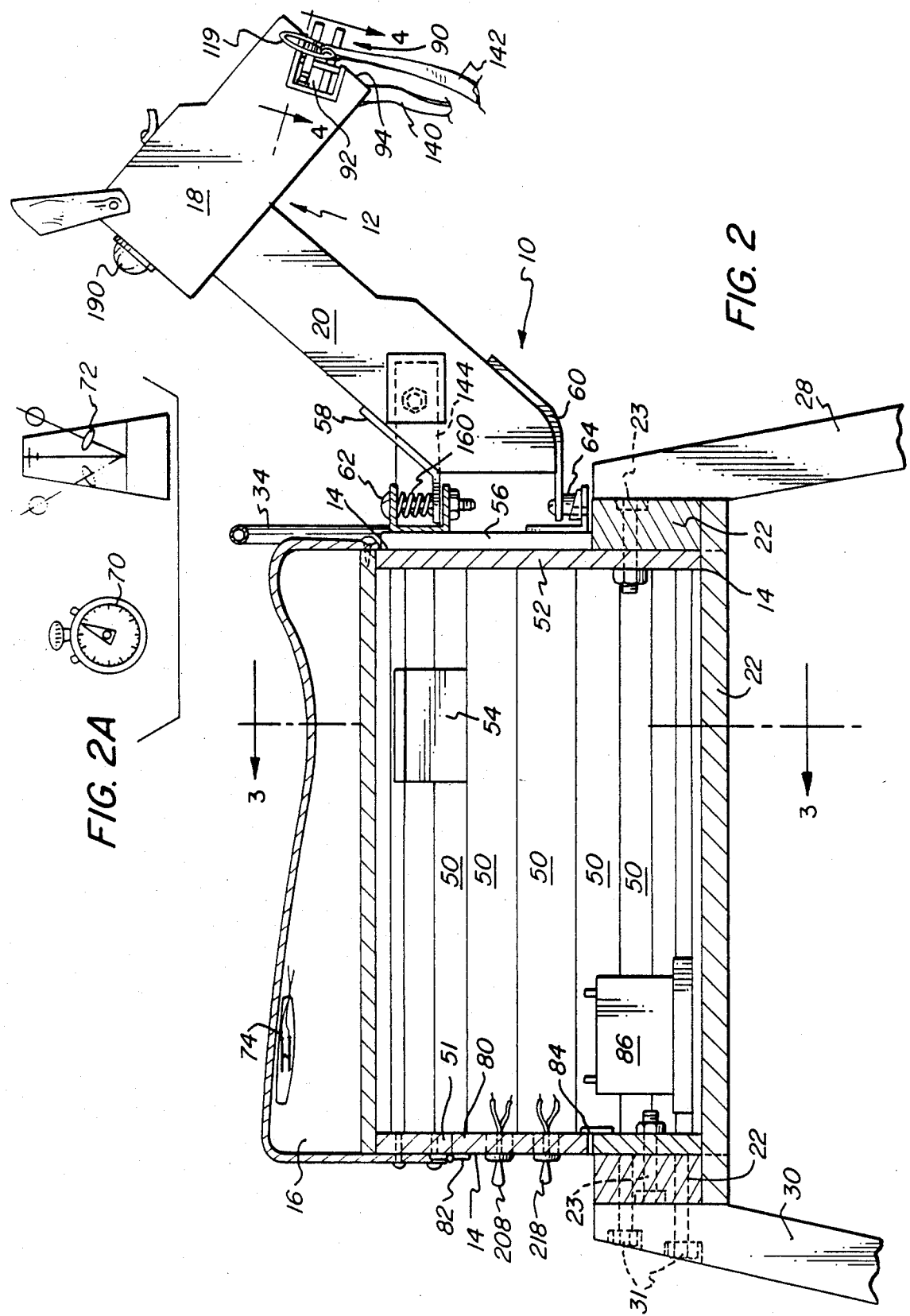
FIG. 2 is a side cross sectional view of the horse in FIG. 1 taken along plane 2—2 of FIG. 1.

Referring now to FIG. 2, a side cross sectional view of horse simulator 10 is shown. Barrel 14 is shown to include a plurality of staves 50, and two ends 51 and 52. A recessed portion 54 of a stave houses stirrup buckle 40 to further prevent chafing (see also FIG. 3).

A pivot mount or mounting frame 56 pivotally mounts neck and head assembly 12 to end 52 of barrel 14. Pivot mount 56 includes two brackets 58 and 60 attached to neck 20 of horse simulator 10. Bracket 58 pivots about a bolt 62 on pivot mount 56. Bracket 60 is secured to pivot mount 56 with a self-centering bolt 64 which serves to enable head assembly 12 to gravitate to a central position.

Referring now to FIG. 2A, a front elevational view of a timer 70 and a metronome 72 is shown. Timer 70 may be used to add an additional level of difficulty to a series of skills, such as stops, turns, and the like.

In teaching a person to ride an actual horse on horse simulator 10, metronome 72 may be used to establish a posting rhythm. Posting is the rising from and descending to the saddle of a rider in accordance with the horse's trot. Metronome 72, then, is used to simulate the pace of a horse's trot.

A pressure sensitive means 74 located within saddle 16 (see FIG. 2) generates a signal which activates an indicator 76 (see FIGS. 5 and 6) to inform the rider when sufficient contact has been made with saddle 16. Although preferably a switch, pressure sensitive means 74 may also be an air or fluid cushion or the like coupled to an indicator capable of activation with air or fluid lines. Indicator 76 helps the rider to establish a posting rhythm which mimics metronome 72. Further, while indicator 76 is preferably a light mounted on neck 20, it may also be a bell, a flag, or the like.

Figure 3:
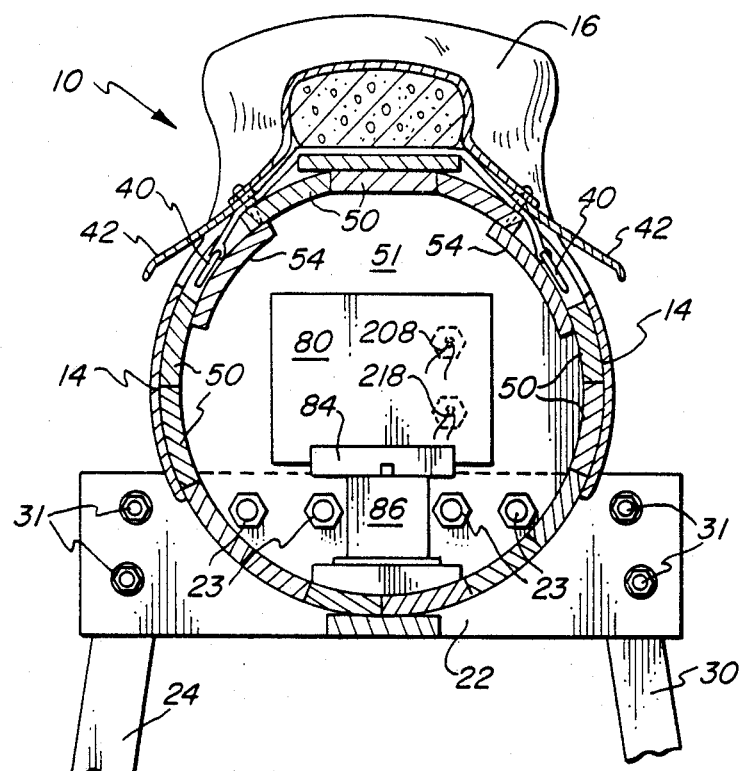
FIG. 3 is a front cross sectional view of the horse in FIG. 1 taken along plane 3—3 of FIG. 2.

Referring now to FIG. 3, a cross sectional view of barrel 14 depicts an access door 80 in barrel end 51. Access door 80 opens via hinge 82 (see FIG. 2) and falls to a close at stop 84. Access door 80 may be used to charge or remove battery or other electrical power source 86 from within barrel 14. Battery 86 is preferably a 12-volt dry cell or rechargeable power pack which drives a circuit discussed below with reference to FIG. 6.

Figure 4:
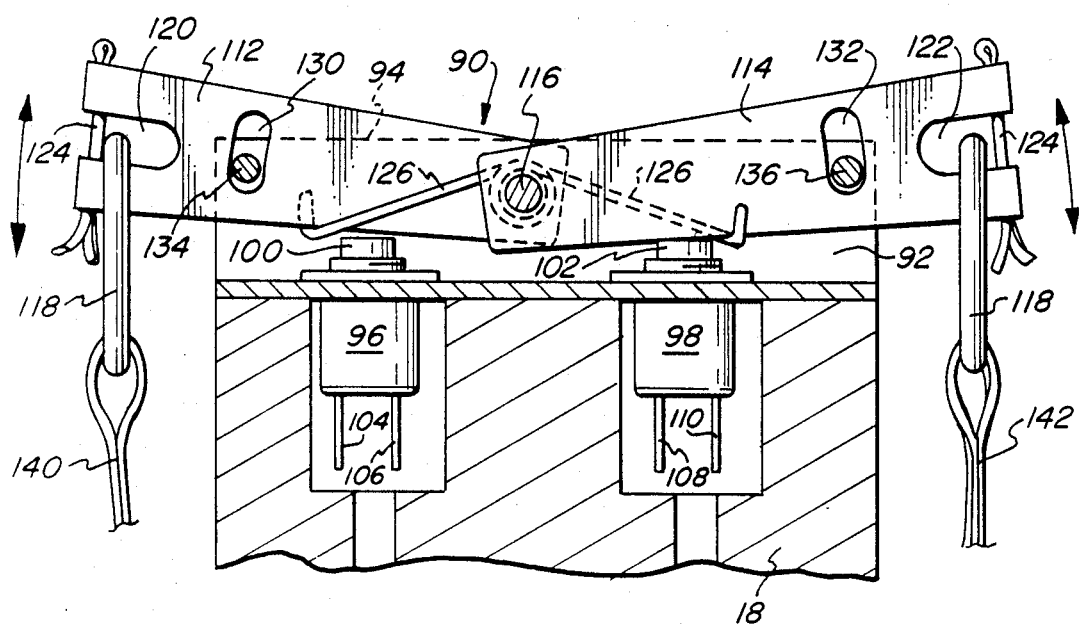
FIG. 4 is a partial cross sectional view of the horse in FIG. 1 taken along plane 4—4 of FIG. 2 and illustrating a bit simulator.

Referring now to FIG. 4, a partial cross sectional top view of head 18 reveals detail of a bit simulator 90 (see also FIG. 2). Head 18 includes a groove 92 which simulates a horse's mouth on a lower forward end 94 thereof. Two spaced-apart switches 96 and 98 having actuators, for example buttons 100 and 102, are mounted within groove 92. Switches 96 and 98 each have two terminals: 104 and 106 for switch 96, and 108 and 110 for switch 98.

Two bars 112 and 114 are each pivotally mounted at one end by a peg 116, while rein rings 118 are mounted at another end within holes 120 and 122 by cotter pins 124. It should be understood that a single bar or a plurality of bars may be used to simulate the bit. Bars 112 and 114 are spring biased away from respective buttons 100 and 102 with spring 126 mounted to both bars 112 and 114, and wrapped around peg 116. Bars 112 and 114 further include holes 130 and 132 which fit over pegs 134 and 136 to restrain the pivotal motion of bars 112 and 114, preventing damage to respective switches 96 and 98. Finally, a left rein 140 is attached to hole 120 of bar 112 via rein ring 118 and a right rein 142 is attached to hole 122 of bar 114 via rein ring 118.

When a person being taught how to ride the simulator pulls both reins simultaneously and with sufficient pressure to activate both spaced-apart switches simultaneously, a stop indicator 143 (see FIGS. 2, 5, and 6) informs the rider that a stop signal has been generated by the bit simulator. Stop indicator 143 is preferably a light but may also be a bell or the like, and may be conveniently mounted to neck 20 in the visual range of the person being trained.

Additionally, the choice of stop and other indicators may advantageously depend upon the perceptive abilities of the rider. For example, a blind person would require a bell or other aural indicator; while a deaf person would require a light or other visual indicator.

Figure 5:
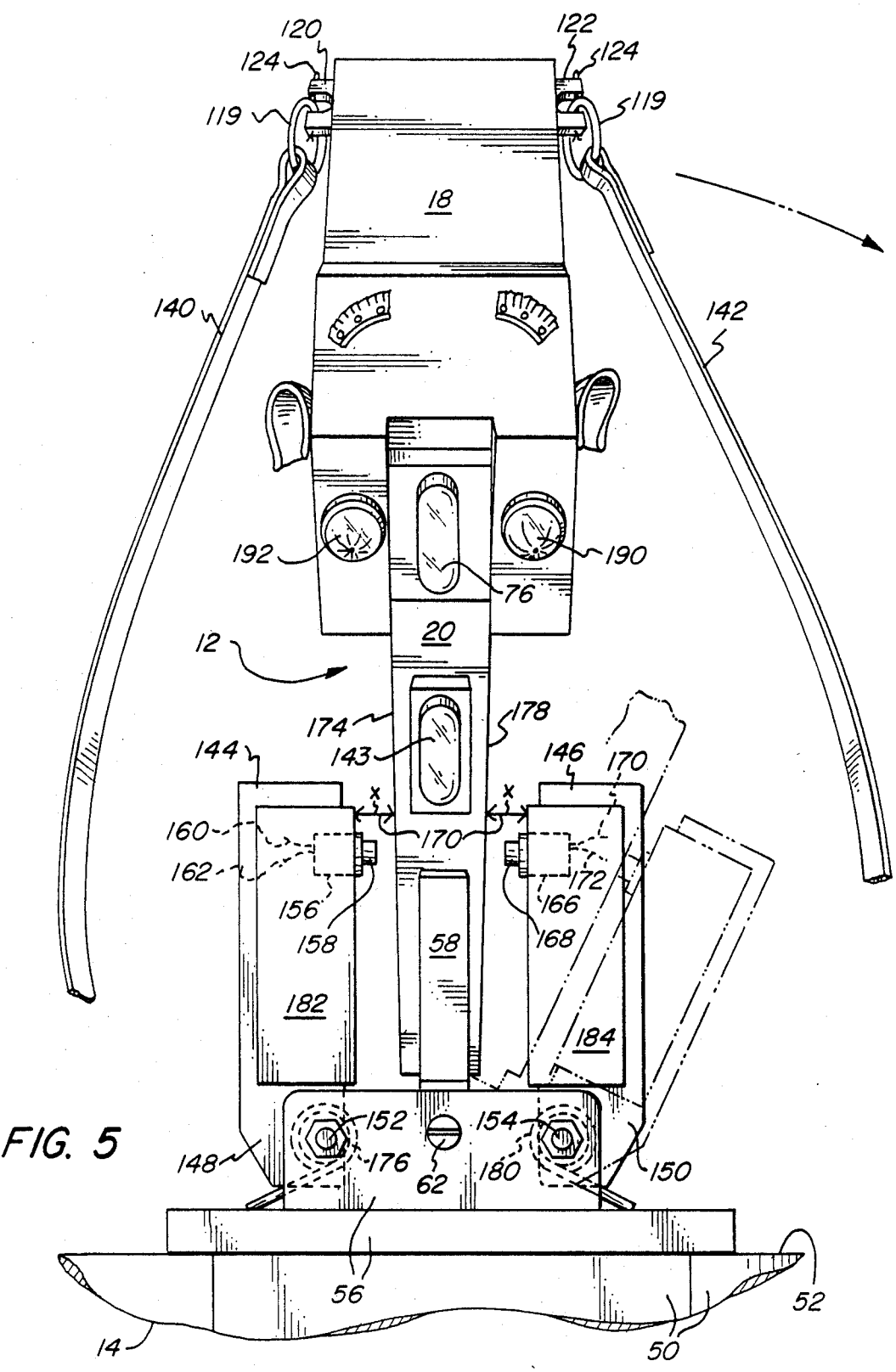
FIG. 5 is a partial top view of the horse in FIG. 1 depicting a pivot mount.

Referring now to FIG. 5, a partial top view of horse simulator 10 reveals additional detail of pivot mount 56. Pivot mount 56 includes a left resistive element 144 and a right resistive element 146 rotatably mounted thereto at respective ends 148 and 150 by bolts 152 and 154. Resistive elements 144 and 146 extend from pivot mount 56 toward neck 20 of horse simulator 10 to resist the turning of head assembly 12. It should be understood that a number of different spring arrangements may be used to resist the turning of the head assembly. Left resistive element 144 includes a left turn switch 156 having a left turn actuator, for example button 158, and two terminals 160 and 162. Similarly, right resistive element 146 includes a right turn button switch 166 having a right turn actuator, for example button 168, and two terminals 170 and 172. It should be understood that the switches may be arranged a number of different ways so as to sense the turning of the head assembly.

Left resistive element 144 is spring biased toward a left side 174 of neck 20 by spring 176. Similarly, right resistive element 146 is spring biased toward a right side 178 of neck 20 by spring 180. Springs 176 and 180 are mounted around respective bolts 152 and 154. Stops 182 and 184 are attached to respective resistive elements 144 and 146 to hold them a distance X, indicated at 170, away from neck 20. Distance X may be adjusted to set the predetermined amount of right and left turning necessary to activate switches 156 and 166.

Pulling by the rider on a single rein, the right for example, will cause the head and neck assembly to turn to the right. When the head assembly has been turned to the right the predetermined amount necessary to activate the right turn switch, a right turn indicator 190 (see also FIGS. 2 and 6) informs the rider that a right turn signal has been generated by the pivot mount. A left turn indicator 192 operates in similar fashion. As discussed above in conjunction with stop indicator 143, the type of indicator may depend upon the perceptive abilities of the rider. Preferably, however, indicators 190 and 192 are lights mounted on respective sides of head 18 in visual range of the rider.

Figure 6:
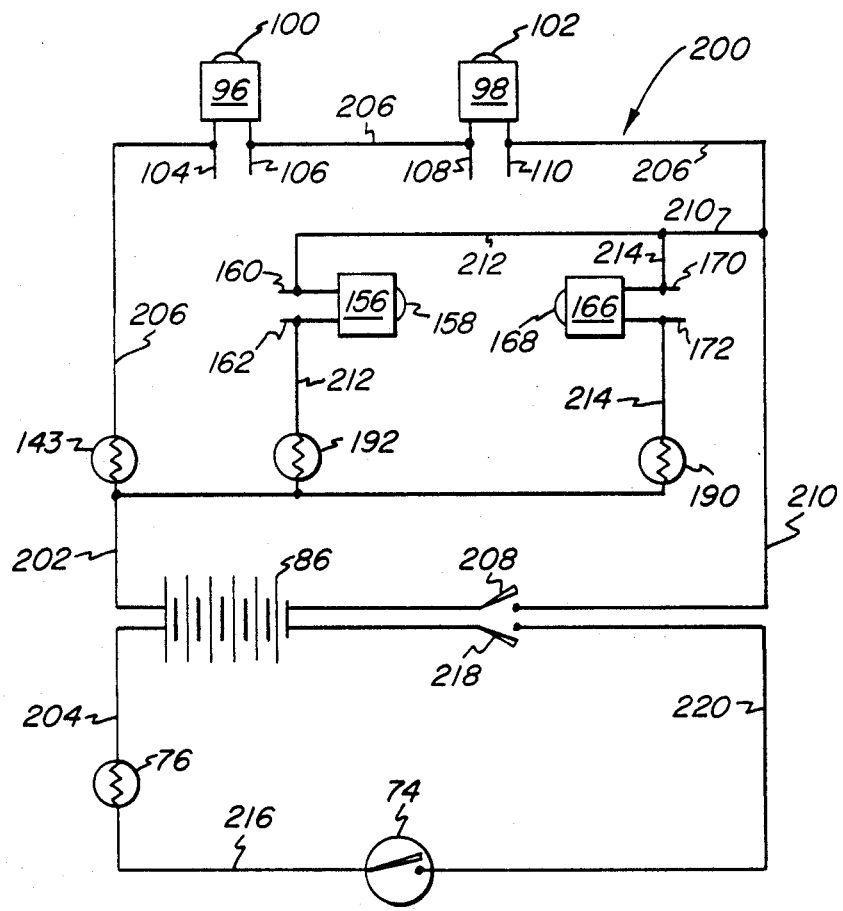
FIG. 6 is a schematic diagram of the circuitry contained in the horse in FIG. 1.

Referring now to FIG. 6, a schematic diagram of an electrical circuit 200 preferably used to activate indicator lights 76, 143, 190, and 192 is shown. Battery 86 is connected by lines 202 and 204 to each of the indicator lights 76, 143, 190, and 192.

Stop indicator light 143 is connected by line 206 to terminals 104 and 106 of button switch 96 and to terminals 108 and 110 of button switch 98 in serial fashion. ON/OFF switch 208 in line 210 completes the circuit to battery 86. Referring briefly to FIGS. 2 and 3, switch 208 is mounted in access door 80 of horse simulator 10. Returning to FIG. 6 and assuming switch 208 is closed or ON, stop indicator light 143 will only turn on when a stop signal is generated by simultaneously closing switches 96 and 98. As discussed above with reference to FIG. 4, a stop signal is generated when the rider pulls back both reins to simultaneously activate the spaced-apart switches.

Left turn indicator light 192 is connected by line 212 to terminals 162 and 160 of left turn switch 156 in serial fashion. ON/OFF switch 208 in line 210 completes the circuit. Assuming switch 208 is closed, left turn indicator light 192 will only turn on when a left turn signal is generated by switch 156. As discussed above with reference to FIG. 5, a left turn signal is generated when the rider pulls the left rein and turns the head assembly the predetermined amount.

Right turn indicator light 190 is similarly connected by line 214 to terminals 172 and 170 at right turn switch 166 in serial fashion. ON/OFF switch 208 in line 210 completes the circuit. Assuming switch 208 is closed, right turn indicator light 190 will only turn on when a right turn signal is generated by switch 166. As discussed above with reference to FIG. 5, a right turn signal is generated when the rider pulls the right rein and turns the head assembly the predetermined amount.

It should be understood that because the right and left indicators are activated separately from the stop indicator, the stop indicator may be activated at the same time as either the right or left indicator. In such a case, the rider is informed that he would be confusing an actual horse by providing conflicting commands at the reins.

Indicator light 76 is connected to pressure sensitive switch 74 by line 216. ON/OFF switch 218 in line 220 completes the circuit to the anode of battery 86. Referring briefly to FIGS. 2 and 3, switch 218 is mounted in access door 80 of horse simulator 10. Returning to FIG. 6 and assuming switch 218 is closed or ON, indicator light 76 will only turn on when there is sufficient pressure on switch 74 such as a seated person.

The horse simulator may be used to teach the skills of mounting; presenting a stop signal, a right turn signal, and a left turn signal at the reins; and posting. Any one or a combination of these skills can be evaluated by an instructor in a training session to determine which skills need the most practice. Future sessions may then concentrate on the weakest skills. For example, the instructor may notice that each time a right turn signal is attempted by the rider, the stop indicator light turns on as well as the right turn indicator light. While this may cause confusion and frustration in a live horse, the skill can be practiced and perfected by the rider in future sessions with the instructor.

Because the horse simulator is most advantageously used with children or handicapped persons, the instructor may also use the training session to determine whether any special equipment or assistance would be necessary to enable the person to ride a live horse. Conversely, more advanced students may also polish their rein and posting skills by completing combinations within an allotted time period.

The above description is not meant to describe in detail each and every modification and variation which will be apparent to a person skilled in the art. It is, however, meant to include all such modifications and variations within the scope of the following claims.

What is claimed is:

1. A horse simulator for training a person to ride a horse, comprising:
   a barrel for simulating a horse's back, an upper surface of the barrel being shaped to form a seat;
   a support frame for supporting the barrel above a floor;
   a head assembly that simulates a horse's neck and head;
   a pivot mount pivotally attaching the head assembly to an end of the barrel;
   a bit simulator mounted to the head assembly;
   right and left reins attached to the bit simulator;
   means incorporated in the bit simulator for generating a stop signal;
   means incorporated in the pivot mount for generating a right and left turn signals;
   means attached to the barrel for generating a pressure signal indicative of when sufficient pressure is applied by the person to the barrel; and
   an indicator light coupled to the pressure signal generating means for actuation by the pressure signal, the indicator light mounted on the head assembly.

2. The horse simulator in accordance with claim 1 wherein the means for generating a pressure signal further comprises a pressure switch so located in relation with the seat that the pressure signal represents the person sitting in the seat.

3. A device for teaching a person how to use horse reins, comprising:
   a body simulating a horse's back;
   a seat attached to the body for seating the person learning how to use horse reins;
   a head assembly mounted to a side of the body for simulating a horse'3 s head and neck;
   spaced-apart switches mounted to the head assembly;
   bar means located in an operative relationship with the spaced-apart switches for activating them;
   means for indicating to the person when the spaced-apart switches are simultaneously activated;
   right and left reins attached to the bar means for pulling the bar means back to activate the spaced-apart switches; and
   the bar means comprising left and right bars pivotally mounted with a common pivot at one end and respectively coupled to left and right reins at the other end.

4. The teaching device in accordance with claim 3 wherein the spaced-apart switches are mounted within a groove located in the head assembly to simulate a horse's mouth.

5. The teach device in accordance with claim 3 wherein the bar means further comprises a spring means for spring biasing the bar means away from the spaced-apart switches.

6. A device for teaching a person how to use horse reins, comprising:
   a body simulating a horse's back;
   a seat attached to the body for seating the person learning how to use horse reins;
   a head assembly that simulates a horse's head and neck;
   a mounting frame attached to a side of the body for pivotally mounting the head assembly to the body;
   resistive elements pivotally mounted to the mounting frame and extending toward the head assembly on opposite sides thereof, wherein the resistive elements are spring biased toward opposite sides of the head assembly to simulate a horse's resistance to turning its head, and wherein the resistive elements are spaced a predetermined distance from opposite sides of the head assembly;
   right and left reins mounted to the head assembly for respectively turning the head assembly right and left; and
   means for indicating when the head assembly has been turned at least the predetermined distance either to the right or to the left.

7. The teaching device in accordance with claim 6 wherein the mounting frame further comprises switch means spaced on opposite sides of the head assembly for sensing its right and left turning by the predetermined distance.

8. The teaching device in accordance with claim 6 wherein the means for indicating when the head assembly has been turned the predetermined distance further comprises a light mounted to the head assembly.

* * * * *